United States Patent
Shaw

[15] 3,670,910
[45] June 20, 1972

[54] MOBILE LOAD HANDLING OR LIFTING MACHINES

[72] Inventor: Donald George Shaw, Albrighton, England
[73] Assignee: Shaw, Trew & Smith Limited, Shifnal, Shropshire, England; a part interest
[22] Filed: July 23, 1970
[21] Appl. No.: 57,536

[52] U.S. Cl. ..........................214/141, 214/148, 180/79.2 R, 212/145, 280/34 R
[51] Int. Cl. ..............................................E02f 3/00
[58] Field of Search ....................214/141, 773, 146.5, 148; 212/145

[56] References Cited

UNITED STATES PATENTS

| | | | |
|---|---|---|---|
| 3,491,906 | 1/1970 | Davidson | 214/770 |
| 3,198,359 | 8/1965 | Lull | 214/146.5 X |
| 2,788,139 | 4/1957 | Tendresse | 214/141 |
| 2,989,202 | 6/1961 | Canniere et al. | 214/730 X |
| 3,305,116 | 2/1967 | McKee | 214/392 |
| 2,990,072 | 6/1961 | Mindrum | 214/141 X |

*Primary Examiner*—Gerald M. Forlenza
*Assistant Examiner*—Jerold M. Forsberg
*Attorney*—Watson, Cole, Grindle & Watson

[57] ABSTRACT

A mobile machine for load handling or lifting purposes is disclosed in which an attachment head, for receiving load handling means attached to it, is carried for raising and lowering movement by forwardly extending parallel motion linkage pivotally connected to a forwardly extendible and rearwardly retractable member of a telescopic boom longitudinally carried by an extendible wheeled chassis of the machine, the boom being also arranged to be bodily advanced or retracted relative to the chassis by support linkage which is linked to the chassis for fore and aft extension of the latter to counteract the machine against forward tipping movement on such bodily advance of the telescopic boom.

2 Claims, 2 Drawing Figures

MOBILE LOAD HANDLING OR LIFTING MACHINES

This invention relates to load handling or lifting machines such as cranes, fork lift trucks, excavators (e.g. trench diggers) or bucket or scoop loaders or similar machines and has for its object to provide a mobile machine capable of readily meeting widely varied operating requirements. Practical advantages in this and other respects will be apparent from the following disclosure.

In a practical embodiment of the invention, the construction and arrangement of the machine is as follows reference being had to the accompanying drawings in which.

Figure 2:
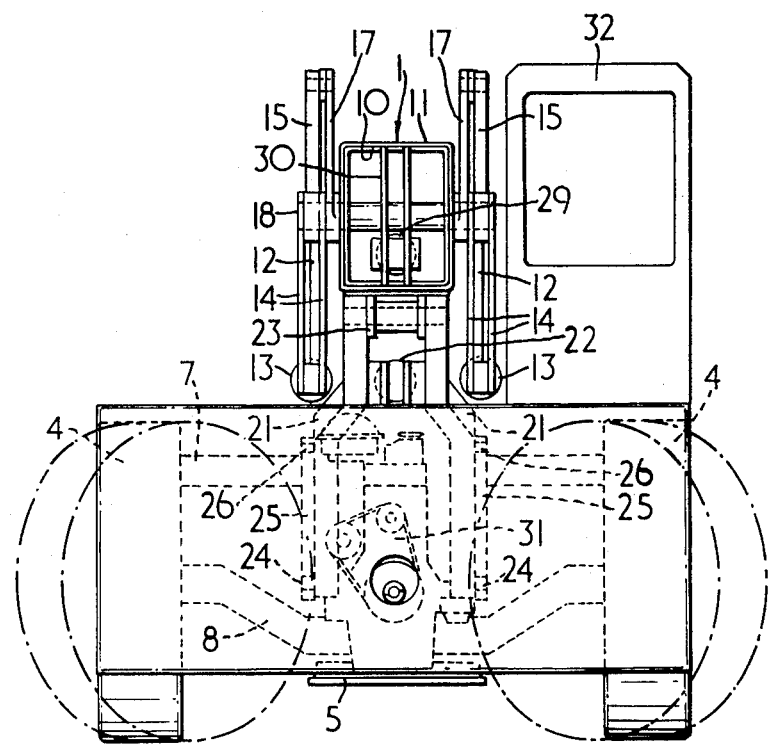
FIG. 2 is a rear view.

The machine is supported on front and rear pairs of ground wheels 3,4 of which the front wheels 3 are arranged to be inturned (see FIG. 2) for slewing purposes and are also forwardly extendible relative to the rear wheels 4 in a manner to be hereinafter described. For this purpose a rear axle beam 8 carrying the rear wheels 4 is mounted from a rear structure 7 of the chassis 6,7 of the machine while a front beam 2 carrying the front wheels 3 is mounted from a forward chassis structure 6 which is slidable in a fore and aft direction relative to the rear chassis structure 7.

All four wheels 3,4 are preferably independently driven by hydraulic motors operatively connected thereto (not shown) while inturning of the front wheels 3 can be effected by hydraulic rams. When the front wheels 3 are inturned slewing movement may be effected about the mid point between the centers of the rear wheels 4 and/or about the center of a retractable turntable 5 which is lowered into contact with the ground for the purpose while the rear wheels 4 are steerable such as by hydraulic ram operation for travelling movement of the machine i.e. with the front wheels 3 in the straight ahead position.

The front of the machine is provided with an attachment head 9 for receiving attached thereto any one of a variety of load handling or lifting devices such as a bucket or scoop loader as at 99, fork lift, crane jib, hydraulic grab, or hydraulic rotating head or a bulldozer blade. The attachment head 9 is arranged to be raised and lowered by a pair of arms 12 pivotally one at each side at 18 from longitudinal support means consisting of a horizontal telescopic jib or boom assembly 1, the arms 12 being operated for such movement by hydraulic rams 13, acting between the arms 12 and brackets 14 depending from an inner member 10 of the telescopic boom 1, which latter is shown consisting of inner and outer tubular members 10,11 of rectangular cross section. For this purpose the arms 12 are pivotally mounted at 18 from the inner member 10.

In order to maintain the attachment head 9 in substantially the same attitude as it is raised and lowered and by means of a further arm 15 in conjunction with each lifting arm 12, a parallel link motion is effected by means of links 16 pivotally connected between the forward ends of the arms 12 and 15, each further or upper arm 15 being pivoted at its rearward end to an upright 17 extending from the inner member 10 of the telescopic boom 1 through a corresponding longitudinal slot 11a in the outer member 11, which slots 11a also permit the connection of the arms 12 and the rear brackets 14, to the inner member 10 and their movement relative to the outer member 11 in a manner to be hereinafter described. As the arms 12 are raised and lowered, the forward links 16 remain substantially vertical and parallel to the rear uprights 17 while the forward links 16 carry a hydraulic ram 19 for effecting forward and rearward tilting of the attachment head 9.

Figure 1:
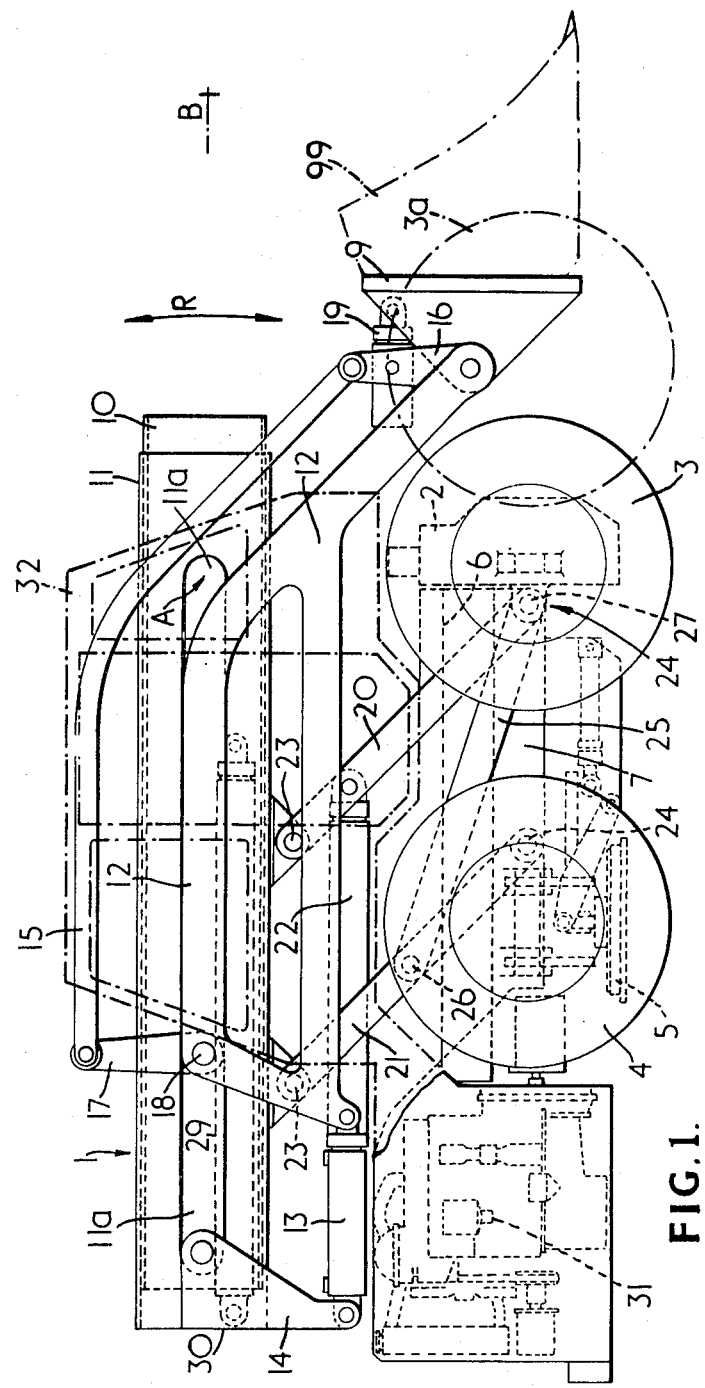
FIG. 1 is a side elevation of the machine.

In FIG. 1 the machine is shown in a retracted condition with the attachment head 9 lowered and capable of being raised through an arc indicated by the arrow R. However, for advancing the attachment head 9 to a forward operating position together with forward extension of the front wheels 3 in order to counteract forward tipping movement of the machine when operated under load in this way, the operation is as follows:

The outer member 11 of the telescopic boom 1 is pivotally supported at 23 by pairs of parallel links 20,21 (shown rearwardly inclined in FIG. 1) from the rear chassis structure 7 and of which the forward links 20 are arranged for hydraulic ram operation at 22 from the rear chassis structure 7.

On the ram 22 being forwardly extended the links 20,21 are angularly moved about their pivotal mountings 24 on the rear chassis structure 7 with an over-center action so as to assume a similar forwardly inclined position. By such movement the links 20,21 forwardly advance bodily the complete telescopic boom 1 together with everything carried by the latter, viz the attachment head lifting arm assembly 12,15,16 and hydraulic rams 13 operating the latter together with the support brackets 14. Thus the attachment head 9 may be operated from the advanced boom 1 in the same manner with pivotal movement of the arms 12 at 18 taking place at or about the point indicated at A. At the same time further links 25 pivotally connected from the rear links 21 at 26 to the front axle beam 2 at 27 cause the latter to be advanced as the parallel links 20,21 perform their angular over-center movement, the forwardly advanced position of the front wheels being indicated at 3a.

Although the pivotal connection 27 of the links 25 to the forward chassis structure 6 is shown coincident with the pivotal connection 24 of the forward links 20 to the rear chassis structure 7 in FIG. 1, it is to be understood that such connections 24,27 are separate from one another and that only the connection 27 is able to move forwardly and rearwardly with the forward chassis structure 6.

In an alternative or additional mode of advancing the attachment head 9 for light load handling either with the boom 1 retracted or advanced (i.e. with or without forward extension of the front wheels 3) the inner member 10 of the boom 1 is advanced forwardly in a telescopic manner relative to the outer member 11 by a hydraulic ram 29 within the inner member 10 and acting between the latter and bracket support 30 within the rear end of the outer member 11.

By such operation of the inner member 10 the pivotal mounting 18 of the arm assembly 12,15,16 thereon carrying the attachment head 9 together with the bracket support 14 of the operating rams 13 to the latter are advanced forwardly as required, the furthermost position of the arm pivotal mounting 18 being at the forward end of the slots 11a i.e. at the position A when the boom 1 is in the retracted position shown. However when the boom 1 is advanced by over-center angular movement of the parallel links 20,21 together with forward extension of the front wheels 3 as already described, advance of the inner member 10 relative to the outer member 11 as just described enables the pivotal mounting 18 of the arms 12 to assume a position indicated at B for long reach operation of the attachment head 9 relative to the machine. Thus the extent to which the attachment head 9 can be advanced can be considerably varied according to operating requirements together with forward extension of the front wheels 3 as necessary to counteract forward tipping of the machine.

An internal combustion engine 31 is shown carried as a counterweight at the rear of the rear chassis structure 7 and drives hydraulic pumps to the various hydraulic rams and motors of the machine, the hydraulic system being controlled from a control position or cab indicated at 32 and carried by the rear chassis structure 7. Although the arrangement described and shown is preferred, if desired the front wheels 3 may be steerable for travelling purposes with the rear wheels 4 arranged for inturning movement when slewing is required. For this latter purpose a retractable turntable 5 may be mounted from the forward chassis structure 6 between the front wheels 3.

What I claim is:

1. A mobile machine for load handling purposes comprising a wheeled chassis consisting of a forward wheeled chassis structure slidably engaging a rear wheeled chassis structure for fore and aft chassis extension and retraction of the machine; a telescopic boom longitudinally carried by said rear chassis structure and comprising two members of which one of said members is forwardly extendible and rearwardly retractable relative to the other of said members in a telescopic manner; ram means acting between said members of said telescopic boom for effecting forward extension and rearward retraction of the said one member relative to said other member; forwardly extending parallel motion lifting and lowering linkage pivotally connected to the said one member of said telescopic boom; an attachment head for receiving load handling means carried by the forward end of said parallel motion linkage; ram means acting between said one member of said telescopic boom and said parallel motion linkage for angularly raising and lowering said linkage and said attachment head about said pivotal connection of said linkage to said one member; angularly movable support linkage carrying said telescopic boom from said rear wheeled chassis structure; ram means acting between said rear wheeled chassis structure and said angularly movable support linkage in order to bodily advance and retract said telescopic boom and said parallel motion linkage and said attachment head carried thereby relative to said wheeled chassis; and connecting linkage pivotally connected between said angularly movable support linkage and said forward wheeled chassis structure whereby, on ram operation of said support linkage to bodily advance said telescopic boom, fore and aft extension of said wheeled chassis is effected to counteract any forward tipping of the machine.

2. The mobile machine for load handling purposes, according to claim 1, wherein said telescopic boom comprises an outer tubular member and an inner member slidable for relative forward extension and rearward retraction within said outer tubular member, said parallel motion lifting and lowering linkage being pivotally connected to said inner member through longitudinal slots in said outer member which slots also permit forward and rearward movement of said parallel motion linkage relative to said outer member.

* * * * *